April 6, 1954   G. A. BRACE   2,674,341
PROPELLING HANDLE AND FILTER ASSEMBLY FOR SUCTION CLEANERS
Filed Dec. 12, 1950   4 Sheets-Sheet 1

INVENTOR.
George A. Brace
BY
Harry S. Dumars
ATTORNEY.

April 6, 1954   G. A. BRACE   2,674,341
PROPELLING HANDLE AND FILTER ASSEMBLY FOR SUCTION CLEANERS
Filed Dec. 12, 1950   4 Sheets-Sheet 4

INVENTOR.
George A. Brace
BY Harry S. Dumars
ATTORNEY.

Patented Apr. 6, 1954

2,674,341

UNITED STATES PATENT OFFICE 2,674,341

PROPELLING HANDLE AND FILTER ASSEMBLY FOR SUCTION CLEANERS

George A. Brace, Highland Park, Ill., assignor to The Hoover Company, North Canton, Ohio, a corporation of Ohio Application December 12, 1950, Serial No. 200,423

26 Claims. (Cl. 183—51)

This invention relates to suction cleaners and more particularly to a simplified and novel filter assembly in combination with the propelling handle, as well as to new and improved components thereof.

There have been numerous problems attending the use of paper filters on floor cleaners. Paramount among these is that of obviating flexure of the filter as the handle pivots in use without resort to costly and cumbersome filter mounting arrangements. Proposals have been made heretofore to enclose the paper filter in a housing movable with the handle or to provide rigid connecting means between the filter adapter and the handle. Such constructions are objectional for various reasons, as for example, their bulkiness, unsightliness, inconvenience when replacing the filter, high cost, and the like.

The present invention, however, provides a construction which overcomes the numerous disadvantages of prior arrangements while achieving increased efficiency, greater convenience, lower cost, much longer filter life and other important advantages.

Accordingly, it is an object of the invention to provide a new and improved suction cleaner.

Another object is the provision of a new and improved disposable paper filter bag.

Still another object is the provision of a simplified filter assembly having a unique means for clamping the filter in place and for requiring the filter assembly to move in unison with the propelling handle during use of the cleaner.

Yet another object of the invention is the utilization of the handle counter-balance spring for the supplementary purpose of holding the filter clamping means closed during use of the cleaner.

A further object is the provision of a filter clamp which closes automatically when the filter adapter is moved toward its normal position beside the handle.

Another object of the invention is the provision of a filter assembly for a suction cleaner having a simple common means for locking the assembly to move in unison with the propelling handle and for clamping the filter in place, as well as an arrangement in which the assembly and filter are released simultaneously.

Still other objects will become evident from the following detailed description of illustrative embodiments of the invention taken with the accompanying drawings, in which.

Figure 3:
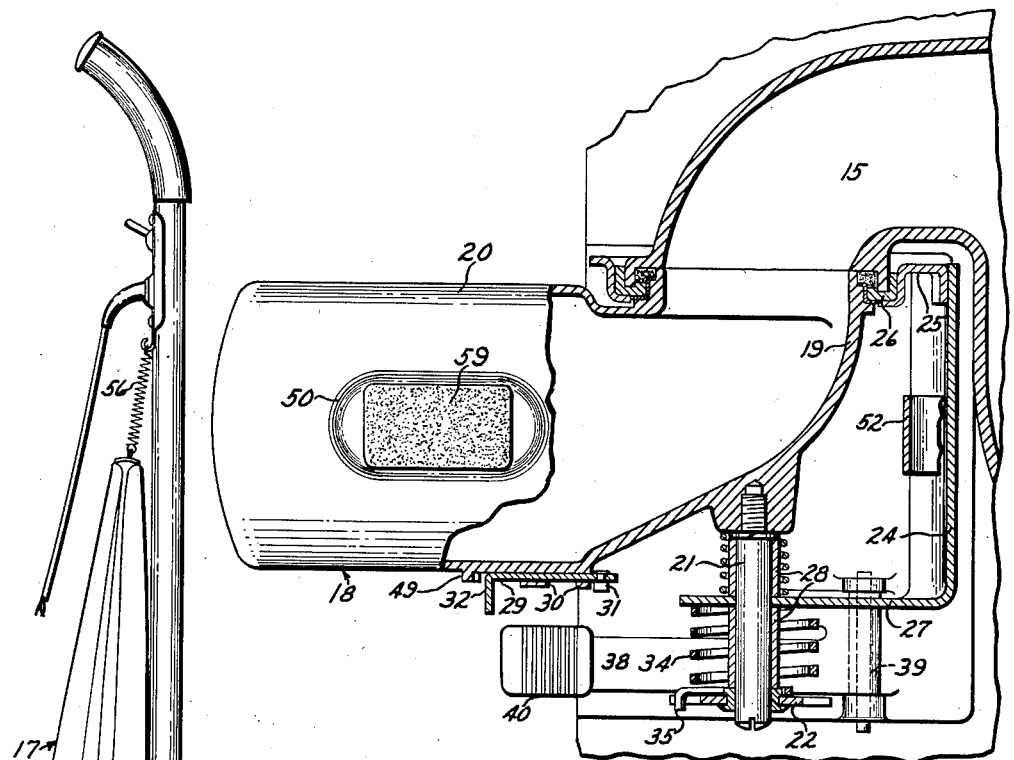
Figure 3 is a horizontal sectional view on line 3—3 of Figure 2.

The embodiments incorporating the present invention are generally similar to the constructions described and illustrated in my co-pending application for Letters Patent, Serial No. 200,422, filed December 12, 1950.

The first embodiment illustrated herein comprises a suction cleaner of the floor type having a main body casing 10 supported by a pair of front carrier wheels 11 and a pair of rear wheels 12. The usual suction nozzle 13 extends crosswise of the body forwardly of the carrier wheels. This nozzle leads into the inlet of a motor-fan unit, not shown, but which is concealed within removable hood 14. The fan chamber discharges through an exhaust air conduit 15 formed in the body casing and having an open end located in a vertical plane parallel to and to one side of the longitudinal center line of the cleaner, as more clearly appears from Figure 3. A cleaner propelling handle 16 of generally conventional construction and a filter assembly 17 are both pivotally secured to the rear end of the cleaner and include many of the novel features of this invention. The constructional details of these components will be described below.

As appears from Figure 3, the filter assembly and the propelling handle pivot about a common axis extending crosswise of the rear of the cleaner body and in alignment with the discharge opening of exhaust air conduit 15. This pivotal mounting includes the filter adapter 18 as the most important single component. As shown, adapter 18 comprises an L-shaped conduit, the shorter leg 19 of which seats upon the end of exhaust conduit 15 in such manner that the longer leg 20 pivots through an arc of 90°. This arc extends from the vertical position of the adapter shown in full lines in Figure 2 backwardly to the horizontal, dotted line position shown in the same figure. Adapter 18 is held assembled in this position by means of a spindle or pivot pin 21 threaded into leg 19 of the adapter and having its opposite outer end journaled in a supporting bracket 22 secured to the cleaner body, as by screws 23.

Propelling handle 16 is provided with a stamped sheet metal bail 24, one side face 25 of which is formed to seat upon the outer surface of a bronze ring or other suitable bearing 26. The inner face of bearing 26 also serves to seat the end of leg 19 of the adapter tube. The opposite side 27 of the handle bail is journaled upon pivot pin 21 and is held in proper position thereon by a pair of spacer thimbles 28.

Figure 2:
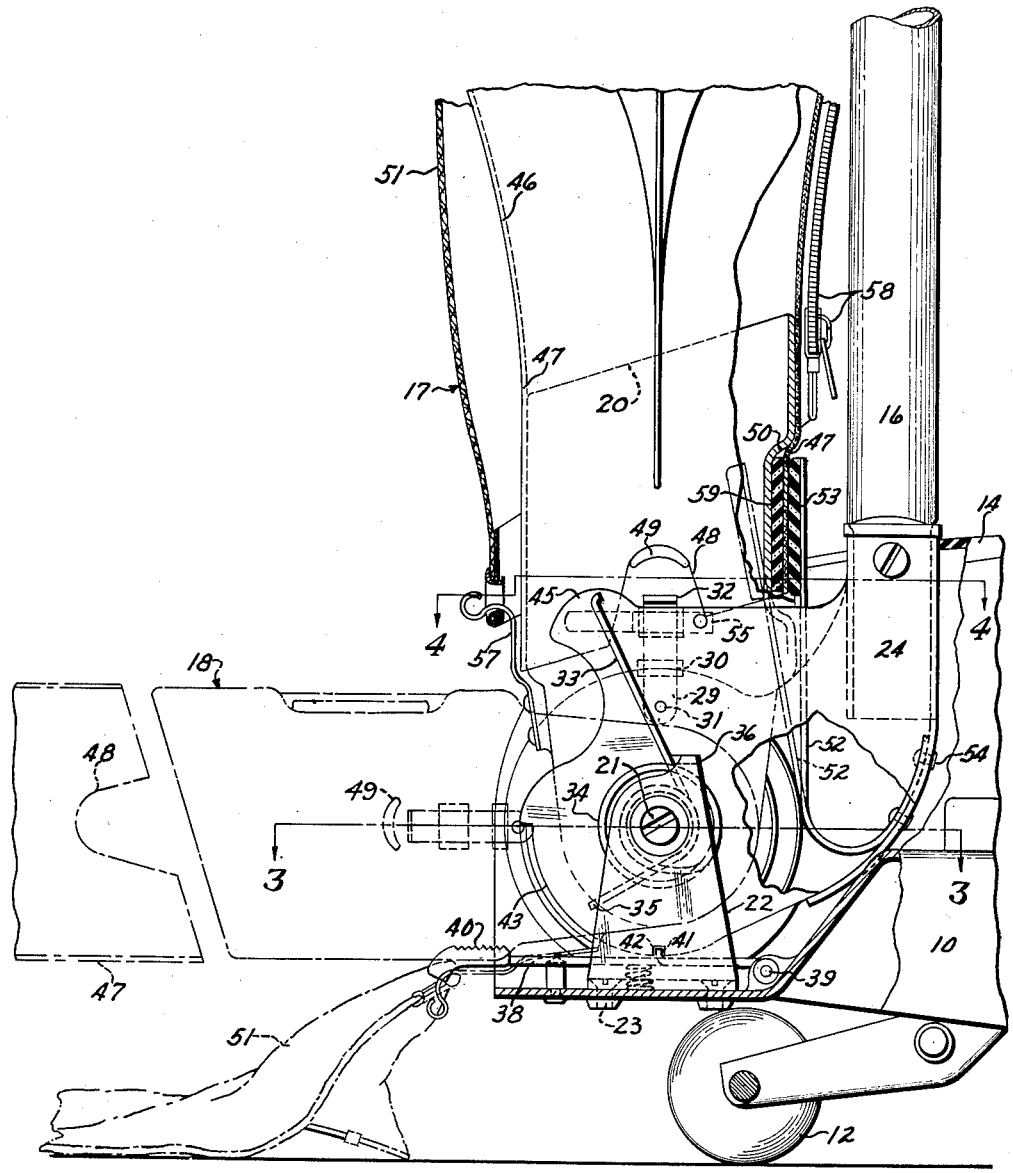
Figure 2 is a fragmentary view partially in section of the rear end of the cleaner showing details of the handle and filter assembly.

As will be readily appreciated from the foregoing, filter adapter 18 and handle 16 are arranged to pivot about a common axis extending transversely of the cleaner body. Figure 2 shows that this axis is above and slightly to the rear of the rear wheel axis. Quite obviously, the handle and filter assembly axis might be otherwise located. However, the cleaner handling and general operating characteristics of the cleaner favor the general disposition illustrated. It will be apparent from the drawings that the adapter and the handle are free to pivot independently of one another, which is advantageous when changing the filter or servicing the cleaner. At all other times, however, it is advantageous for the filter assembly and propelling handle to pivot in unison to avoid flexing the filter proper. The present invention provides for both of these desirable objectives very simply, as will now be described.

Referring to Figure 2, it will be seen that adapter 18 has a slide member 29 mounted within retaining straps 30—30 immediately above pivot pin 21. A stop pin 31 at the lower end of slide 29 holds the slide assembled within retainers 30—30 and the upper end of the slide is bent outwardly at right angles to the adapter so as to lie in the path of end 33 of the handle counterbalance spring 34. The counter-balance spring comprises a stiff coil spring surrounding the outer end of pivot pin 21 between the outer face of bail member 27 and the inner side of bracket 22. One end of this spring may be anchored to bracket 22 or any other part of the cleaner while longer end 33 extends upwardly in position to be engaged by end 33 of slide 29 when the adapter is pivoted rearwardly.

It is to be particularly observed that end 33 of the handle counter-balance spring is locked out or disconnected from the handle and from adapter 18 just before the handle reaches the vertical storage position as shown in Figure 2. The lockout means comprises a horizontally extending arm or stop 36 attached to the upper end of handle bracket 22. Stop 36 terminates beside the face of the handle bail and in the path of end 33 of the counterbalance spring so as to engage the spring just before the handle and filter assembly reach the vertical position in which the handle is ineffective to propel the cleaner in the usual manner. Should the handle be lowered from this position, end 32 of slide member 29 engages or picks up the outermost end 33 of the spring placing the latter under increasing stress as the handle is lowered. Hence, in all inclined operating positions of the handle below this predetermined point, i. e., the point at which slide 29 picks up the spring, the counter-balance spring acts directly upon the filter adapter and urges it in a clockwise direction as viewed in Figure 2. Spring 34 is preferable sufficiently strong to substantially counter-balance the weight of both the filter assembly and the propelling handle.

The handle is locked in its vertical storage position automatically by a handle control mechanism. This mechanism comprises a foot operated lever 38 pivoted to the cleaner body at 39 and having a foot pedal 40 at its rear end convenient to the operator's toe. A detent 41 on lever 38 is positioned to engage a notch 42 formed in the edge of control sector 43 forming a part of bail face 27 when the handle is raised to the storage position. The control lever is spring biased upwardly so that, normally, detent 41 rides on the edge of sector 43 as the handle pivots through its inclined range of movement. If desired, a suitable stop or notch may be formed in sector 43 about 55° rearwardly of notch 41 so as to support the handle in an inclined rest position.

In order that adapter 18 may be pivoted rearwardly independently of the handle and of spring 34, side 27 of the handle bail is provided with a cam surface 45 directly to one side of end 33 of the counter-balance spring. As appears most clearly from Figures 3 and 4, cam 45 lies in the path of end 32 of slide member 29 when the adapter is pivoted rearwardly independently of the handle. Hence, when the handle is locked in storage position and the adapter is swung rearwardly, end 32 of slide 29 engages cam 45 causing the slide to override end 33 of the counterbalance spring. Likewise, when the adapter is again swung upwardly, the end 32 on the slide again engages cam 45 so as to restore the slide to the forward side of end 33 of the counter-balance spring. Slide 29 thereupon falls by gravity to the full line position shown in Figure 2 in readiness to again pick up the counter-balance spring if the handle is pivoted rearwardly.

The filter proper preferably comprises an inexpensive paper filter bag 46 provided with an inlet neck 47 having a perimeter slightly in excess of discharge end 20 of adapter 18 so as to be easily telescoped thereover. In order to assure proper assembly of the filter on the adapter, the filter neck has a notch 48 which seats upon a locator projection 49 formed integrally with the adapter tube. While this locator may be positioned at any point on the adapter, it is here shown as being positioned directly above the end of slide 29.

The clamping means for holding the filter neck on the adapter tube in an air tight manner forms another important feature of this invention and will be best understood by reference to Figures 2 and 3. From these figures it will be noted that the forward, upper side wall of the adapter tube is provided with an elongated depression 50 of sufficient depth to receive the gathered inlet neck of the filter. A resilient pad 59 of sponge rubber or other suitable material may be cemented to the bottom of the depression to serve as a resilient support for the gathered portion of the filter when it is depressed thereinto. The neck of the filter is gathered so as to grip the adapter tube in an air tight manner by depressing the portion thereof overlying depression 50 into the depression by means of a clamping device here shown as comprising a resilient U-shaped spring member 52 carrying a pad 53 at its upper end. The other end of spring 52 is secured to the propelling handle as by rivets 54. Spring 52 is sufficiently strong to gather the surplus perimeter of neck 47 into the depression without however unduly stressing the neck. Its normal, unstressed position is indicated by dotted lines in Figure 2; hence, spring 52 tends to pivot adapter 18 counter-clockwise away from handle 16.

Figure 4:
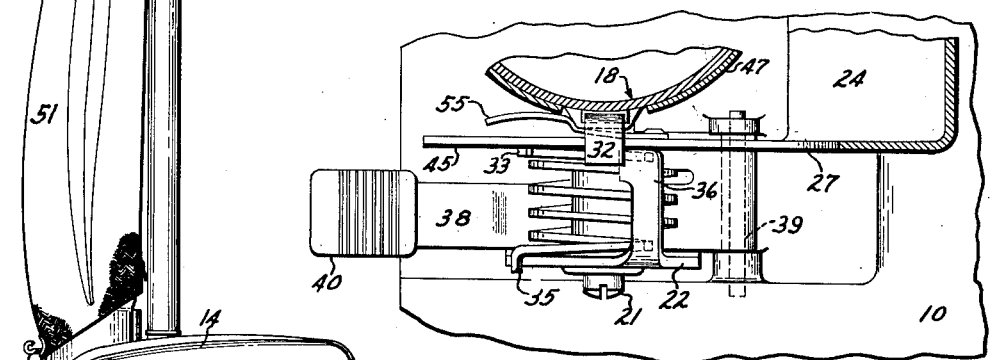
Figure 4 is a sectional view on line 4—4 of Figure 2.
Figure 1:
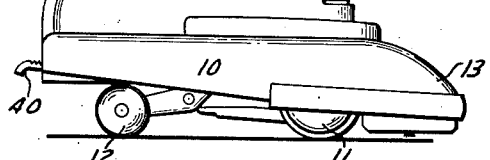
Figure 1 is a side elevational view of a cleaner incorporating the invention.

However, this normally undesired result is safeguarded against in two ways. Thus, during normal operation of the cleaner when the handle is in an inclined position, spring 52 is opposed by the handle counter-balance spring acting through slide member 29 and the adapter. At other times when the handle is in its storage position, spring 34 is locked out or disconnected from the adapter by step 36. Under these conditions, a keeper latch spring 55 secured to the inner, top edge of face 27 of the handle bail, as shown in Figures 2 and 4, latches over the rear edge of upper strap 30 for slide 29 and holds the adapter in the proper position to maintain the filter clamp in closed position. The rearmost end of spring 55 forms a conveniently positioned thumb grip for manually releasing the latch and which is shaped so as to be depressed by strap 30 when the adapter is swung upwardly against the propelling handle.

Filter bag 46 is preferably enclosed in an appearance envelope 51, the upper end of which is resiliently attached to the upper end of the propelling handle by coil spring 56. The lower rear edge of the appearance envelope may be secured to the rear face of the adapter below the end of th filter bag by a snap fastener or by spring clip 57. The forward face of envelope 51 is provided with a hookless slide fastener 58 which opens upwardly from the bottom of the envelope and which is normally concealed from view by handle 16.

OPERATION

Let it be assumed that the cleaner is assembled and that the handle is locked in storage position. To place the cleaner in operation, the operator connects the service cord to a power source. The handle is lowered by depressing pedal 40 of handle control lever 38. As the handle swings backwardly, tab 32 on slide 29 engages and picks up end 33 of the counter-balance spring so that this spring is thereafter operable to counter-balance the handle and the filter assembly. The motor-fan unit sucks a stream of dirty air inwardly through nozzle 13 and discharges it through conduit 15 and adapter 18 into filter bag 46. As the cleaner moves backwardly and forwardly over the carpet and the handle pivots, counter-balance spring 34 acts through slide 29 and the adapter to counter-balance the weight of the entire pivoted assembly. It also urges the adapter counter-clockwise against filter clamping spring 52 and assists the latter in firmly clamping the filter bag to the adapter conduit. A still further function of the counter-balance spring is to hold the entire filter assembly against the rear side of the handle in all cleaner propelling positions of the handle so that the filter assembly moves in unison with the handle. As a result, no flexing occurs in any part of the filter wall despite the continual pivotal movement of the handle in use.

When the filter bag requires emptying or renewal, the operator places the handle in storage position where it is positively locked by the action of handle locking lever 38 on control sector 43. The operator then detaches spring 56 from the handle and presses keeper spring 55 outwardly to release adapter tube 18. As filter clamping spring 52 pivots the adapter rearwardly, tab 32 on slide 29 engages cam 45 causing the slide to override the end 33 of the counter-balance spring 34. Further rearward pivotal movement of the adapter allows the operator to open hookless fastener 58 on the appearance envelope completely exposing filter bag 46. This pivotal movement also opens filter clamping spring 52 releasing the neck 47 of the filter bag from the adapter so that it may be readily removed therefrom to a point of disposal.

The neck of a new filter is then telescoped over the end of the adapter and slide fastener 58 is closed. As soon as this is accomplished, the operator picks up spring 56 and rehooks it to the back of the handle causing the entire filter assembly to pivot upwardly. In so doing, the top of slide 29 engages cam 45 and overrides the end of the counter-balance spring. Concurrently therewith, pad 53 on filter clamping spring 52 engages the forward lower wall of the filter neck and depresses it into cavity 50 on the adapter tube. This causes the neck of the filter to be gathered into the cavity and to grip the adapter in an air tight manner. It is also desirable but not necessary for the operator to push forwardly on the rear side of the adapter causing keeper spring 55 entirely to override strap 30 on the adapter and to latch the latter in its normal operating position. If the operator should neglect to perform this last mentioned step, the counter-balance spring will act to latch the adapter behind keeper spring 55 upon the first lowering of the handle.

The cleaner is now ready for continued operation in the same manner as described above.

SECOND EMBODIMENT

The second embodiment illustrated herein includes many components which are identical or very similar to their counter-parts in the first embodiment. Accordingly, these have been designated by the same reference characters distinguished by a prime. In view of this similarity, detailed description of the similar parts of the two embodiments will be unnecessary.

One of the basic differences between the two embodiments is that counter-balance spring 34' acts directly between the cleaner body and the propelling handle in accordance with conventional practice. Accordingly, it is not utilized to counter-balance the handle through the filter adapter, nor does it assist in any way in clamping the filter bag to the adapter.

Accordingly, it will be observed that propelling handle 16' and the filter assembly 17' are mounted in the same general manner so as to pivot about a common horizontal axis extending transversely of the cleaner. However, it is to be borne in mind that these components may be mounted to pivot about separate axes extending parallel to one another. Moreover, while adapter 18' has been shown as comprising a single, rigid element, it is to be understood that the principal consideration is the provision of a flexible connection between the end of exhaust air conduit 15 and tubular member 29' constituting the seat and connector member for the filter bag proper. Handle bail members 24' and 27' extend upwardly so as to substantially enclose the lateral sides and forward face of adapter 18' enhancing the general appearance of the cleaner. It is obvious that the corresponding members in the first embodiment may be similarly formed if desired.

The clamping means for the filter bag is similar in principle to the first embodiment but differs in constructional detail. As most clearly appears from Figure 7, the forward face of the filter seating tube 20' on the adapter is provided with a pair of vertically extending pockets or depressions 60—60. The clamping member proper comprises a flat spring member 61 having its center riveted to the handle at 62. The outer ends of spring 61 carry resilient pads 63—63 located directly behind depressions 60—60 in the adapter when the latter is swung upwardly against the rear side of the propelling handle. These pads serve to gather the slight surplus portions of filter neck 47' into depressions 60 so that the filter grips the adapter tube 20' firmly and in an air tight manner.

Figure 5:
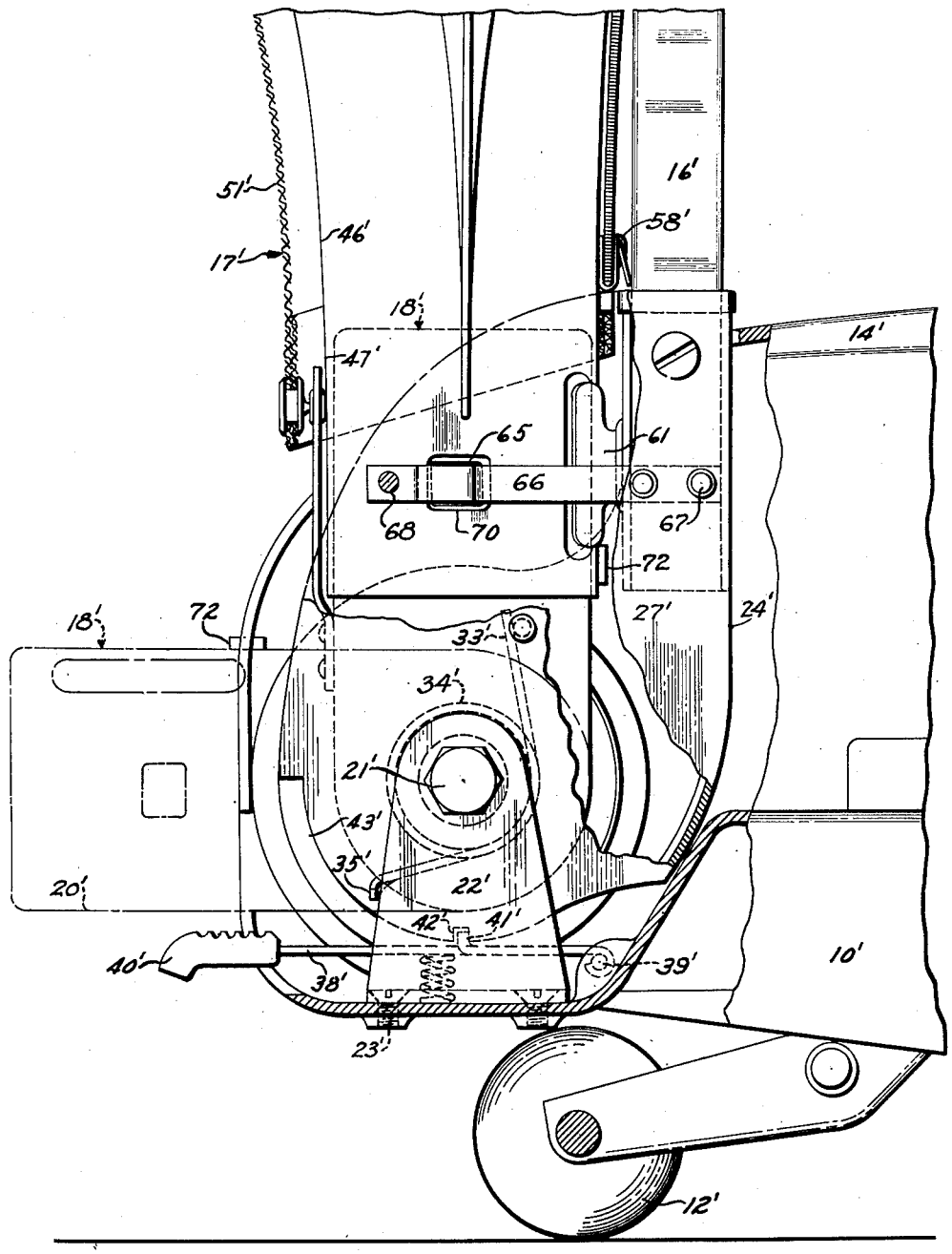
Figure 5 is a view similar to Figure 2 of a second embodiment.
Figure 7:
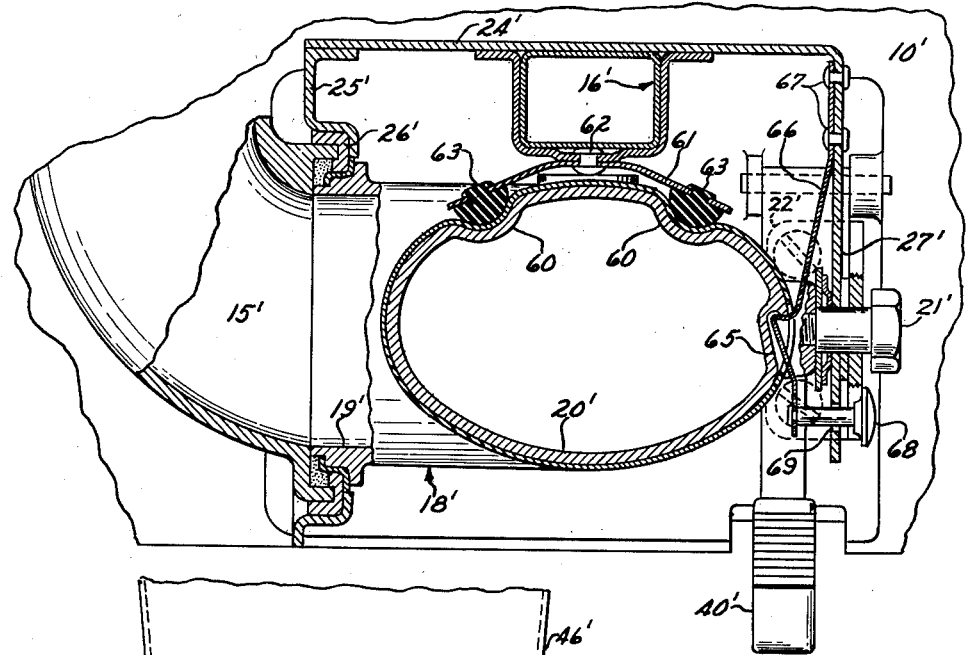
Figure 7 is a sectional view on line 7—7 of Figure 6.
Figure 6:
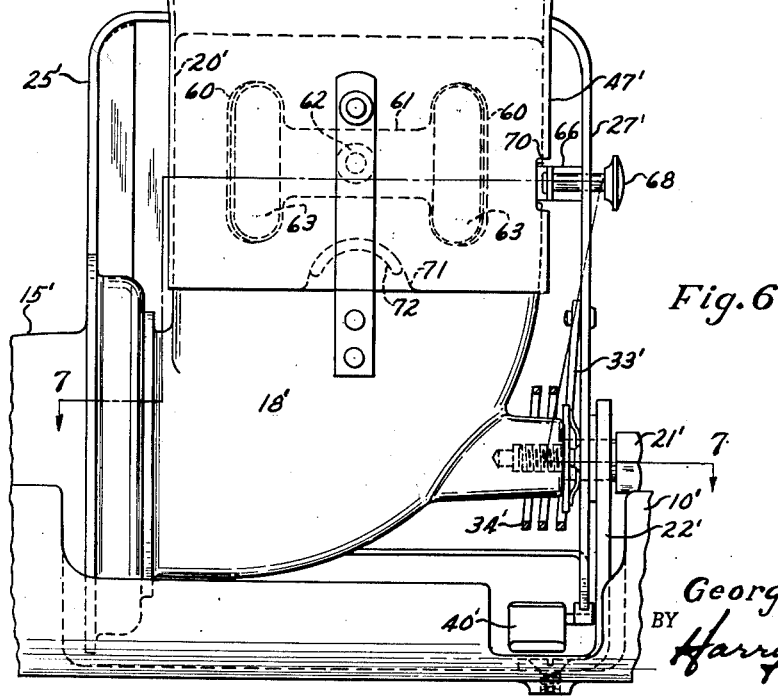
Figure 6 is an elevational view taken across the rear end of the cleaner shown in Figure 5.

A spring latch is employed to hold the adapter in its normal operating position and the filter clamp in closed position. Details of this latch are shown in Figures 5 to 7. Thus, the right hand side wall of the adapter is provided with a latching depression 65. This depression is located in the same plane as filter clamping spring 61. One end of a spring keeper latch 66 is secured to the inner side wall of bail member 27' by rivets 67, while a manual control button 68 is mounted on the outer end of the spring by means of a stem which projects through an opening 69 in the side wall of the bail.

The inlet neck of paper filter bag 46' is provided with an opening or cut-out 70 in its side wall which registers with latching depression 65 in the side wall of the adapter provided the filter inlet 47' is properly positioned on the adapter tube. If the filter inlet is provided with a built-in tubular paper valve, as is desirable, this valve may serve to reinforce the inlet neck and it is provided with a hole in registry with hole 70. To aid the operator in properly assembling the filter onto the adapter so that cut-out 70 registers with depression 65, the lower edge of the inlet has a notch 71 to mate with a locator projection 72 formed on the adapter. Preferably, notch 71 and locator 72 are located on the forward side of the adapter tube so as to be in full view of the operator during assembly of the filter.

OPERATION

When the components are assembled as shown in Figures 5 to 7 of the drawing, it will be clear that latch spring 66, in cooperation with filter clamping spring 61, constrains the filter adapter and the entire filter assembly to pivot in unison with the propelling handle despite the use of a flexible connection between filter seating tube 20' and the exhaust air outlet 15' on the body of the cleaner. When it is necessary to replace the filter bag, the operator raises the handle to the vertical storage position where it is locked by the engagement of detent 41' in opening 42' of control sector 43' on the handle bail. The operator then unhooks the top of the appearance envelope from the handle and pulls outwardly on button 68 to disengage the clamping spring 66 from the adapter tube. The entire filter assembly is then free to pivot rearwardly to the dotted line position shown in Figure 5. As this occurs, the adapter is moved away from the filter clamping spring 61 thereby releasing the filter bag from tube 20'. As soon as closure 58' on the appearance envelope 55' is opened, the filter bag can be lifted therefrom and taken to a point of disposal. The inlet of a new filter bag is then telescoped over the end of the adapter tube so that notch 71 mates with locator 72 on the adapter. The operator then closes the appearance bag and pivots the assembly upwardly until the detent portion of latching spring 66 extends thru opening 70 in the side wall of the filter inlet and into the notch provided by depression 65 as clearly shown in Figure 7. As the adapter approaches the handle, pad 63 on clamping spring 61 gathers the neck of the filter into depressions 60, thereby clamping and sealing the inlet to the adapter.

As will be readily appreciated, the sides of opening 70 in the filter neck cooperate with latching spring 66 in preventing accidental withdrawal of the filter from the adapter despite the clamping action of spring 61 and pad 63. An additional and important function of opening 70 is to insure that the filter is properly positioned on the adapter before it is swung upwardly and before it is clamped thereto. Thus, unless opening 70 is in registry with latching depression 65, latch spring 66 cannot enter depression 65 and the adapter cannot be latched to the handle. The operator is readily apprised of this fact since spring 61 will force the adapter away from the handle to an abnormal angular position giving notice to the operator that an improper assembly has been made. Another and important function of this novel filter construction is to insure the use of filters having necks of uniform and proper dimensions for satisfactory operation with my simplified and highly efficient filter clamping mechanism. Thus, if the neck is too small, the clamp may rupture it when closing, and if the neck is too large, the clamp will not gather it sufficiently to provide an air tight seal with the adapter.

From the foregoing it will be apparent that the present invention provides an exceedingly simple and rugged construction in which the filter assembly and the propelling handle for the cleaner normally pivot in unison and in which the means locking the components together forms an essential part of the means for clamping the filter in place on the cleaner. Obviously, the principles of the invention can be practiced by various structures other than those specifically illustrated and described. For example, the filter assembly and the propelling handle need not pivot on a common axis. Another obvious change is the location of the propelling handle to either side of the filter assembly as well as to the rear thereof. The filter clamp itself may also be made in various ways other than those shown as, in fact, can any or all of the major components of the construction.

I claim:

1. A propelling handle and filter assembly for use on a suction cleaner of the floor type having an exhaust air outlet comprising, an elongated propelling handle, a filter assembly, means providing a common pivot for the lower end of said handle and said assembly, said filter assembly including a filter adapter to receive the inlet of a filter bag thereover, clamping means for clamping a filter inlet to said adapter in an air tight manner automatically as said adapter is pivoted toward said handle and for releasing said filter as said adapter is pivoted away from said handle, and releasable means for normally holding said adapter closely adjacent said handle whereby to lock a filter on said adapter and whereby said handle and said filter assembly pivot in unison about said common pivot therefor.

2. In combination with the body of a floor type suction cleaner, a propelling handle pivoted to said body, a filter assembly extending along side said handle, means detachably connecting the upper end of said assembly to said handle, pivotal means connecting the lower end of said assembly to said body at a point adjacent the lower end of said handle, said assembly including a flexible conduit adapted to receive the inlet of a filter bag over the discharge end thereof, resilient means restricted to one side of said adapter for automatically clamping a filter bag to said conduit in an air tight manner as said adapter is pivoted toward said handle and for releasing the filter when the adapter is pivoted away from said handle, and means for holding said adapter and handle in a position to clamp a filter in place on said flexible conduit in an air tight manner.

3. The combination defined in claim 2 in which said adapter holding means includes a counter-balance spring operable to substantially counter-balance the weight of said filter assembly and said handle when the same are in an inclined cleaner propelling position.

4. The combination defined in claim 3 including stop means operable to disengage said counter-balance and render the same ineffective on said filter clamping means after said handle is elevated beyond a predetermined position.

5. The combination with a suction cleaner of the floor type having a propelling handle pivoted thereto, of a filter adapter flexibly connected to the exhaust air outlet of said cleaner, said adapter being arranged to receive the inlet of a filter bag over the outlet end thereof, means for clamping a filter inlet to said adapter, said clamping means being movable between a closed filter clamping position and an open non-clamping position and including means extending between the filter clamping portion thereof and said handle operative to move said clamp to closed position as said adapter is moved toward said handle.

6. The combination defined in claim 5 wherein said filter clamping means is confined to one side of said adapter.

7. The combination defined in claim 5 wherein said filter clamping means is mounted on said handle whereby said adapter is free and unobstructed by the filter clamping means when said clamping means is in open position and said adapter is moved away from said handle.

8. The combination defined in claim 5 wherein said filter clamping means comprises means for gathering the inlet neck of a filter bag about said adapter and toward a zone thereon adjacent said handle, said gathering means including a resilient support therefor carried by said handle.

9. The combination defined in claim 8 wherein said adapter is provided with a depression in the outer wall thereof underlying the inlet neck of a filter bag when in place thereon, said filter gathering means being operative to gather the neck of a filter into said depression as said adapter is moved toward said handle thereby firmly clamping a filter to said adapter in an air tight manner.

10. In combination with a suction cleaner having an exhaust air conduit, a filter adapter connected to said conduit for telescopically receiving the inlet of a filter bag thereover, means positioned laterally of and restricted to one side of said adapter for clamping said filter thereto in an air tight manner, and means adjacent to but independent and separate from said adapter for supporting said clamping means, said last means being movable toward said adapter to clamp the inlet of a filter thereto and away from said adapter to release the clamping action on a filter.

11. The combination defined in claim 10 in which said filter clamping means includes means for gathering the inlet neck of a filter bag tightly about said adapter and into a depression in said adapter underlying said filter inlet, and releasable means for locking said filter clamping means in place after a filter neck has been gathered into said depression.

12. The combination with the propelling handle of a suction cleaner, of a filter adapter conduit having a normal operating position adjacent said handle, supporting means for said adapter whereby said adapter is movable toward and away from said handle, said filter adapter being shaped to receive the inlet of a filter bag thereover, and resilient filter clamping means carried by said handle adjacent the filter receiving portion thereof, said clamping means being operative to clamp a filter to said adapter in an air tight manner when said adapter is locked in said normal position and operative to release a filter therefrom when said adapter is unlocked and moved away from said handle, and means independent of said filter clamping means for locking said adapter in said normal operating position adjacent said handle to hold said clamp in said filter clamping position and for requiring said adapter to move in unison with said propelling handle.

13. The combination defined in claim 12 including a counter-balance spring for said handle, said counter-balance spring being effective on said handle through said adapter and said filter clamping means whereby said clamping means is held in filter clamping position by said counter-balance spring.

14. The combination defined in claim 13 including lock out means for disengaging said counter-balance spring from said adapter when said handle is elevated beyond a predetermined point.

15. The combination defined in claim 12 wherein said means for holding said adapter in said normal operating position includes a spring biased detent engageable in a depression in the outer wall of said adapter, a filter bag on said adapter having an opening in the side wall of its inlet neck positioned to register with said depression in said adapter wall to permit entry theretinto of said detent whereby said filter cannot be withdrawn from said adapter while said detent is in said opening.

16. The combination with a suction cleaner having an air discharge conduit, of a filter assembly connected with said conduit including a filter adapter, a filter bag having an inlet telescoped over the discharge end of said adapter, a depression in said adapter beneath said filter inlet, an opening in said filter inlet arranged to register with said depression when said filter is properly seated on said adapter, and means for locking said filter to said adapter including a detent extending through said opening in said filter inlet and into said depression in said adapter.

17. The combination defined in claim 16 wherein the marginal edge of said filter inlet is cut away to form a notch extending axially of said inlet, and a locator projection on said adapter positioned to receive said notch, said notch and locator being so positioned that said opening in the inlet wall registers with said depression in said adapter when said filter is properly mounted thereon.

18. A filter bag for use on a suction cleaner comprising an envelope of air pervious material, said bag having an inlet comprising a cylindrical tubular member adapted to be telescoped over an air discharge conduit of a suction cleaner, said tubular member being provided with an opening through the side wall thereof adapted to register with a depression in the side wall of an air discharge conduit for receiving a keeper detent adapted to extend through said opening and into said depression to lock said filter against withdrawal therefrom.

19. A filter bag for use on a suction cleaner as defined in claim 18 including a notch in the inlet rim of said tubular member extending axially thereof, said notch being adapted to mate with a similarly shaped locator member on a filter adapted conduit which locator has the same circumferential position relative to a depression therein as said notch has to the opening in the wall of said tubular member whereby said notch serves as a guide to the proper assembly of said filter on a filter adapter of a suction cleaner.

20. In combination, a suction cleaner having a body provided with an exhaust air passage having a discharge end lying in a vertical plane extending longitudinally of said body, a propelling handle having a U-shaped bail pivoted to said cleaner body on an axis normal to and traversing the discharge end of said air passage, a filter adapter elbow positioned between the sides of said bail and having one end swivelly connected to the discharge end of said air passage, the other end of said adapter being shaped to telescopically receive and seat the inlet of a paper filter bag, a depression in the outer surface of said adapter underlying the inlet of a filter seated thereon, a resilient filter clamping member carried by said handle operable to depress a portion of the wall of a filter inlet into said depression as said adapter is pivoted toward said handle thereby gathering said inlet circumferentially so as to grip the adapter in an air tight manner, and means for releasably retaining said adapter in this last mentioned position and for constraining the adapter to pivot in unison with the handle.

21. A suction cleaner as defined in claim 20 wherein said U-shaped handle bail includes a pair of side members and a web interconnecting the same forwardly of a pair of bearings for said handle located at the lower ends of said side members, means pivotally supporting the lower end of said adapter so as to pivot on the same axis as said bearings for said handle, the depression in the surface of said adapter being located so as to face the web of said bail, and said filter clamping member being supported on said web and having a portion thereof positioned to depress the wall of a filter inlet into said depression as the discharge end of the adapter is pivoted toward said web and said clamping member.

22. A suction cleaner having an exhaust air conduit discharging horizontally and transversely of the body thereof, a propelling handle having a bail, means for supporting one side of said bail for pivotal movement about the discharge end of said air conduit, bracket means spaced laterally of and opposite the end of said conduit, a filter adapter elbow positioned between the sides of said bail having one end swivelly connected to the discharge end of said air conduit, said adapter having a filter seating air discharge end normally positioned beside and parallel to said handle, a pivot pin extending through one side of said bail, through said bracket, and into said elbow, a coiled handle counterbalance spring surrounding said pin at a point between said bracket and the bail of said handle having one end anchored to said cleaner and the other end extending upwardly along said adapter and operative to engage the same and urge the adapter upwardly against the handle, and a clamp for holding a filter bag seated on the discharge end of said adapter, said clamp being mounted on said handle and including resilient means for engaging the inlet of a filter seated on said adapter and pressing said inlet against the adapter and for urging said adapter to pivot away from said handle in opposition to the action of said handle counterbalance spring.

23. A suction cleaner as defined in claim 22 including lock-out means for disengaging said handle counterbalance spring and rendering the same ineffective to counterbalance said handle as the latter approaches the vertical position thereof whereby said adapter is pivotable independently of said handle to facilitate the replacement of the filter.

24. A suction cleaner as defined in claim 23 including manually releasable latch means for holding said adapter in its normal operating position parallel to said handle while the latter is in the vertical position whereby said filter clamp continues to hold a filter clamped to the adapter until said latch means is manually released.

25. In combination, a suction cleaner having an exhaust air conduit, a tubular filter adapter connected to said conduit, an air pervious paper filter bag having a tubular inlet adapted to be telescoped over the end of said adapter and clamped in air tight engagement therewith, said adapter having a detent receiving depression in the outer surface thereof at a point beneath the inner side wall of the tubular inlet of said filter bag, said tubular inlet having an opening extending through the wall thereof at a point spaced from the inlet rim of said tubular inlet, said opening being positioned to overlie and register with said depression in said adapter when said inlet is properly seated thereon, and detent means carried by said cleaner having an end adapted to extend through said opening in the filter inlet and into said depression to lock said filter bag against withdrawal from said adapter so long as said detent extends through said opening and into said depression, said detent being movable to a position to one side of said depression to release said filter bag and permit the same to be assembled onto said adapter or withdrawn therefrom without interference from said detent.

26. The combination defined in claim 25 wherein the inlet rim of said tubular inlet is notched, said adapter having a locator member projecting laterally therefrom and positioned to seat in said notch when the filter is properly seated on said adapter, said boss and said depression having the same relative positions on said adapter as said notch and opening of said filter inlet have relative to one another whereby said boss and notch provide a visual guide to the operator for bringing said opening into registry with said depression during the assembly of the filter onto the adapter.

References Cited in the file of this patent

UNITED STATES PATENTS

| Number | Name | Date |
| --- | --- | --- |
| 2,098,028 | Burkhardt | Nov. 2, 1937 |
| 2,295,981 | White | Sept. 15, 1942 |